United States Patent
Kanoh et al.

(10) Patent No.: US 12,030,500 B2
(45) Date of Patent: Jul. 9, 2024

(54) VEHICLE CONTROL APPARATUS AND VEHICLE CONTROL METHOD

(71) Applicant: HONDA MOTOR CO., LTD., Tokyo (JP)

(72) Inventors: Tadahiko Kanoh, Wako (JP); Kunimichi Hatano, Wako (JP); Tsubasa Shibauchi, Tokyo (JP); Yuta Takada, Tokyo (JP); Shogo Kobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 17/217,415

(22) Filed: Mar. 30, 2021

(65) Prior Publication Data
US 2021/0300377 A1    Sep. 30, 2021

(30) Foreign Application Priority Data

Mar. 31, 2020  (JP) ................. 2020-063864

(51) Int. Cl.
| | | |
|---|---|---|
| *B60W 30/095* | (2012.01) | |
| *B60W 30/12* | (2020.01) | |
| *B60W 30/18* | (2012.01) | |
| *B60W 60/00* | (2020.01) | |

(52) U.S. Cl.
CPC .. *B60W 30/18163* (2013.01); *B60W 30/0956* (2013.01); *B60W 30/12* (2013.01)

(58) Field of Classification Search
CPC ....... B60W 30/18163; B60W 30/0956; B60W 30/12; B60W 2556/50; B60W 60/001; B60W 2420/52; B60W 2554/4049; G08G 1/167; G08G 1/16; B62D 15/0255

USPC .......................................................... 701/23
See application file for complete search history.

(56) References Cited

U.S. PATENT DOCUMENTS

| | | |
|---|---|---|
| 2018/0118223 A1 | 5/2018 | Mori et al. |
| 2019/0152525 A1 | 5/2019 | Resch |
| 2019/0271985 A1 | 9/2019 | Mimura et al. |
| 2019/0384305 A1 | 12/2019 | Nubo et al. |

(Continued)

FOREIGN PATENT DOCUMENTS

| | | |
|---|---|---|
| CN | 109923018 A | 6/2019 |
| JP | 2017-081425 A | 5/2017 |

(Continued)

OTHER PUBLICATIONS

Office Action dated Feb. 1, 2022 issued over the Japanese Patent Application No. 2020-063864 and the English translation thereof.

(Continued)

*Primary Examiner* — Abby Y Lin
*Assistant Examiner* — Hossam M Abd El Latif
(74) *Attorney, Agent, or Firm* — Carrier, Shende & Associates P.C.; Joseph P. Carrier; Jeffrey T. Gedeon

(57) ABSTRACT

A vehicle control apparatus comprises a judging section that judges whether a destination of a user vehicle is set, and a lane change control section that, if the destination is not set, enables performance of a single lane change causing the user vehicle to perform a lane change from the user lane to a first other lane, and if the destination is set, enables the single lane change and also enables a multiple lane change causing the user vehicle to perform a lane change from the user lane to a second other lane through the first other lane.

17 Claims, 8 Drawing Sheets

(56) References Cited

U.S. PATENT DOCUMENTS

| | | | |
|---|---|---|---|
| 2020/0070835 A1* | 3/2020 | Fukuda | B60W 60/001 |
| 2020/0070889 A1* | 3/2020 | Fukuda | G05D 1/0088 |
| 2020/0079380 A1* | 3/2020 | Yu | B60W 60/001 |
| 2020/0247413 A1* | 8/2020 | Fukuda | B60W 30/10 |
| 2021/0163011 A1* | 6/2021 | Maru | G08G 1/167 |
| 2021/0237739 A1* | 8/2021 | Hayakawa | B60W 30/18163 |

FOREIGN PATENT DOCUMENTS

| | | | |
|---|---|---|---|
| JP | 2017081425 A * | 5/2017 | |
| JP | 2018-108767 A | 7/2018 | |
| JP | 2018108767 A * | 7/2018 | |
| JP | 2019-217829 A | 12/2019 | |
| WO | 2016/157814 A1 | 10/2016 | |
| WO | 2018/087883 A1 | 5/2018 | |
| WO | 2019/239665 A1 | 12/2019 | |

OTHER PUBLICATIONS

Office Action dated Sep. 9, 2023 issued over the corresponding Chinese Patent Application No. 202110340367.8 with the English machine translation thereof.

Office Action dated Feb. 6, 2024 issued in the corresponding Japanese Patent Application No. 2023-061851, which is a divisional application of the corresponding Japanese Application No. 2020-063864, with the English machine translation thereof.

* cited by examiner

VEHICLE CONTROL APPARATUS AND VEHICLE CONTROL METHOD

CROSS-REFERENCE TO RELATED APPLICATION

This application is based upon and claims the benefit of priority from Japanese Patent Application No. 2020-063864 filed on Mar. 31, 2020, the contents of which are incorporated herein by reference.

BACKGROUND OF THE INVENTION

Field of the Invention

The present invention relates to a vehicle control apparatus and a vehicle control method causing a user vehicle to change lanes from a user lane in which the user vehicle is travelling to another lane.

Description of the Related Art

Japanese Laid-Open Patent Publication No. 2018-108767 discloses a vehicle control apparatus that performs an automated lane change in accordance with the intent of the driver. This vehicle control apparatus causes the user vehicle to continuously move laterally when the driver continuously performs manipulations of a blinker lever in the same direction. This vehicle control apparatus performs, as this continuous lateral movement, a lane change from the user lane to another lane adjacent thereto and a travel path change from the other lane to a branching path.

SUMMARY OF THE INVENTION

In the vehicle control apparatus of Japanese Laid-Open Patent Publication No. 2018-108767, the driver must continuously perform the same direction instruction operation when causing the user vehicle to continuously move laterally. That is, the vehicle control apparatus of Japanese Laid-Open Patent Publication No. 2018-108767 merely performs an automated lane change in accordance with the manipulations made by the driver. This vehicle control apparatus itself does not recognize whether a lane change from the user lane to the other lane adjacent thereto is to be performed or a travel path change from the user lane to the branching path is to be performed. Accordingly, the driver must determine the type of lane change to be performed based on the driver's own intent.

The present invention has been devised taking into consideration the aforementioned problem, and has the object of providing a vehicle control apparatus and vehicle control method that can reduce the burden on the driver relating to automated lane changes.

A first aspect of the present invention is a vehicle control apparatus that causes a user vehicle to perform a lane change from a user lane in which the user vehicle is travelling to another lane, comprising a judging section that judges whether a destination of the user vehicle is set, and a lane change control section that, if the destination is not set, enables performance of a single lane change causing the user vehicle to perform a lane change from the user lane to a first other lane, and if the destination is set, enables the single lane change and also enables a multiple lane change causing the user vehicle to perform a lane change from the user lane to a second other lane through the first other lane.

Another implementation of the first aspect of the present invention is a vehicle control method causing a user vehicle to perform a lane change from a user lane in which the user vehicle is travelling to another lane, comprising a judgment step of judging whether a destination of the user vehicle is set, and a lane change step of, if the destination is not set, enabling performance of a single lane change causing the user vehicle to perform a lane change from the user lane to a first other lane, and if the destination is set, enabling the single lane change and also enabling a multiple lane change causing the user vehicle to perform a lane change from the user lane to a second other lane through the first other lane.

A second aspect of the present invention is a vehicle control apparatus that causes a user vehicle to perform a lane change from a user lane in which the user vehicle is travelling to another lane, comprising an outside recognizing section that recognizes an environment around the user vehicle; a trajectory generating section that generates a trajectory from the user lane to the other lane, based on a recognition result of the outside recognizing section; and a vehicle control section that causes the user vehicle to travel along the trajectory, wherein: if the user vehicle is to perform a lane change from the user lane to a first other lane, the trajectory generating section generates a first trajectory from the user lane to the first other lane and the vehicle control section performs a single lane change causing the user vehicle to travel along the first trajectory; and if the user vehicle is to perform a lane change from the user lane and through the first other lane to a second other lane leading to a destination, the trajectory generating section generates a second trajectory from the user lane to the second other lane and the vehicle control section performs a multiple lane change causing the user vehicle to travel along the second trajectory.

Another implementation of the second embodiment according to the present invention is a vehicle control method for causing a user vehicle to perform a lane change from a user lane in which the user vehicle is travelling to another lane, comprising an outside recognition step of recognizing an environment around the user vehicle; a trajectory generation step of generating a trajectory from the user lane to the other lane, based on a recognition result of the outside recognition step; and a vehicle control step of causing the user vehicle to travel along the trajectory, wherein: if the user vehicle is to perform a lane change from the user lane to a first other lane, the trajectory generation step includes generating a first trajectory from the user lane to the first other lane and the vehicle control step includes performing a single lane change causing the user vehicle to travel along the first trajectory; and if the user vehicle is to perform a lane change from the user lane and through the first other lane to a second other lane leading to a destination, the trajectory generation step includes generating a second trajectory from the user lane to the second other lane and the vehicle control step includes performing a multiple lane change causing the user vehicle to travel along the second trajectory.

According to the present invention, it is possible to reduce the burden on the driver relating to automated lane changes.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a vehicle control apparatus and vehicle control method according to the present invention will be presented and described below with reference to the accompanying drawings.

[1. Configuration of the Vehicle Control Apparatus 10]

Figure 1:
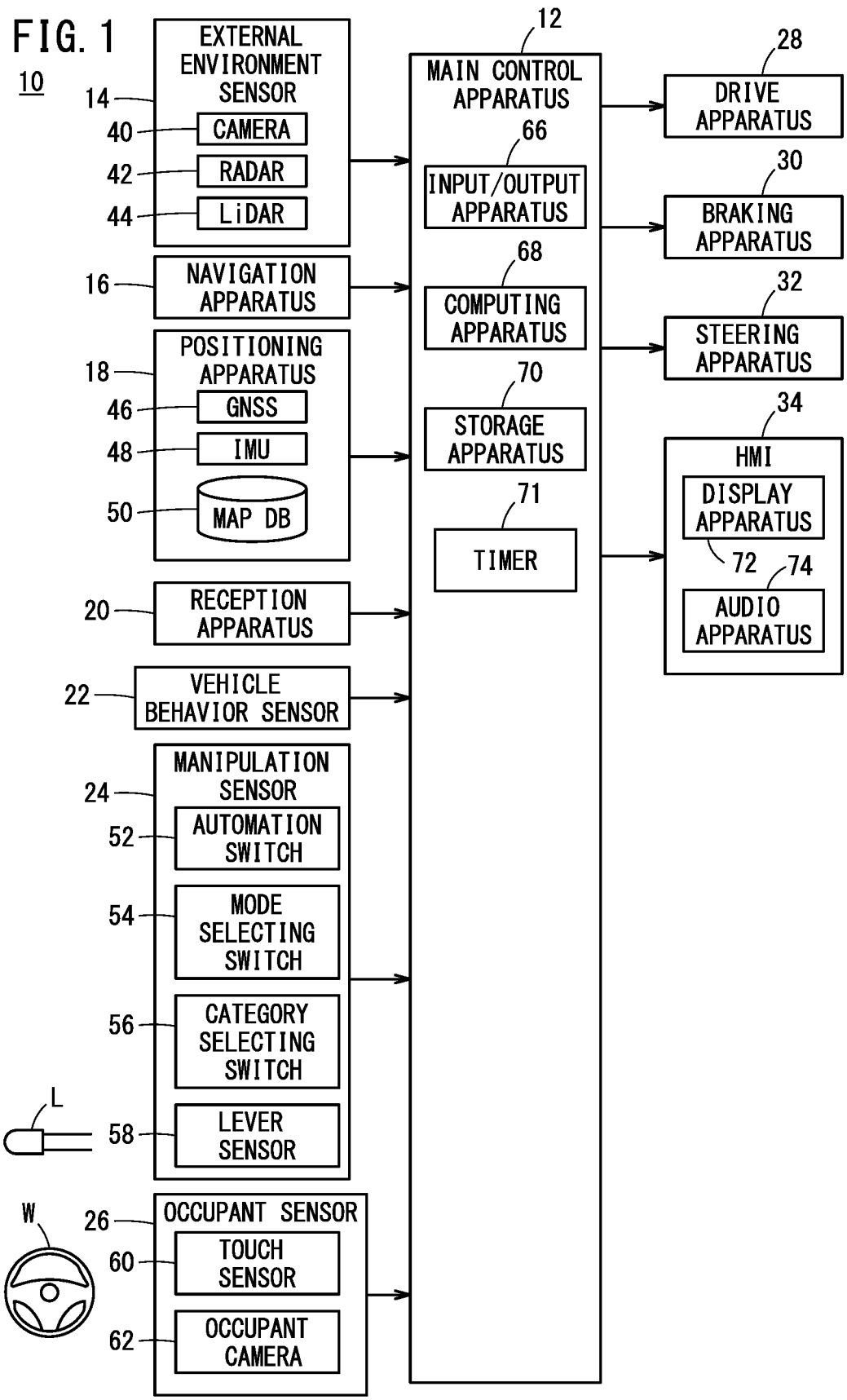
FIG. 1 is a block diagram of a vehicle control apparatus.
Figure 3:
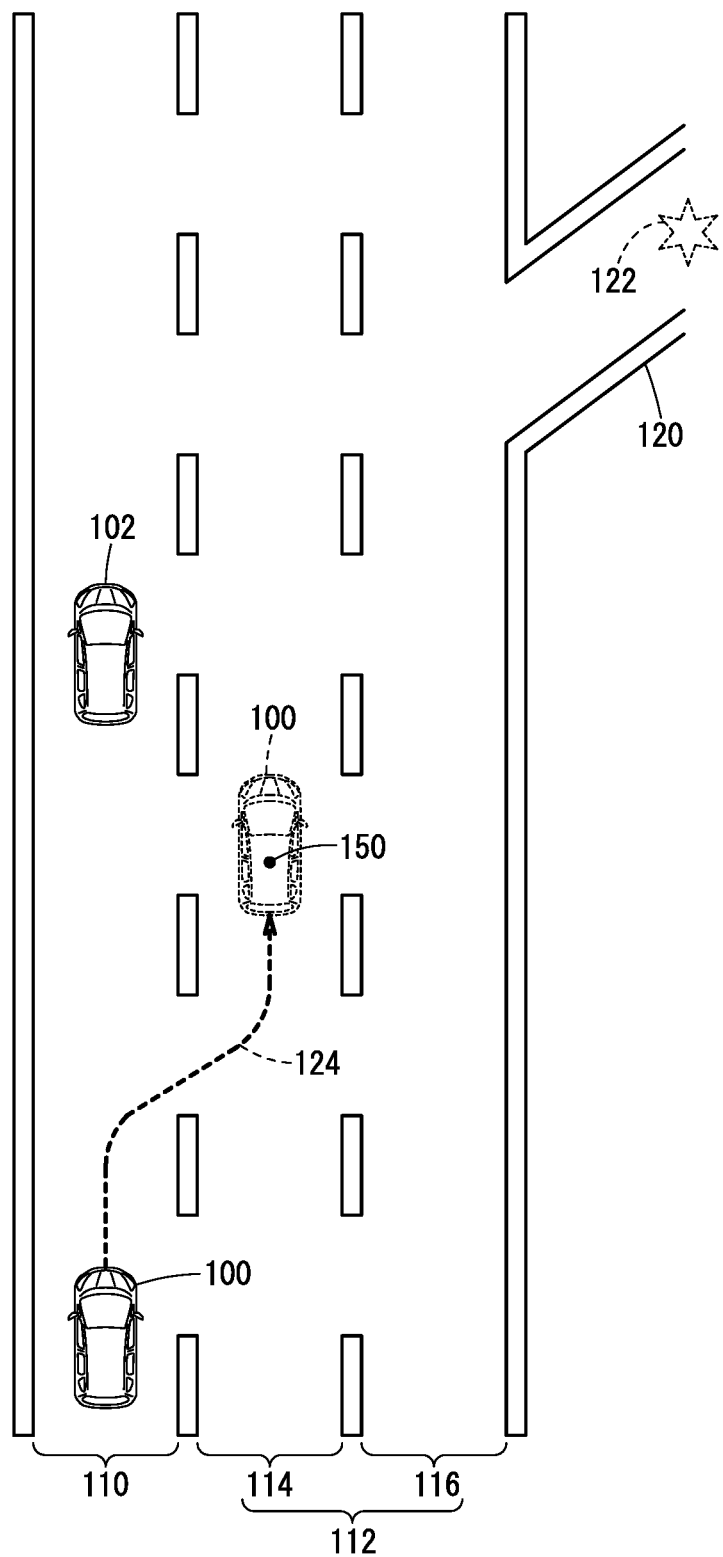
FIG. 3 is a diagram showing a performance state of a single lane change.

The configuration of a vehicle control apparatus 10 will be described using FIG. 1. The vehicle control apparatus 10 is provided to a user vehicle 100 (FIG. 3). The vehicle control apparatus 10 has a so-called driving assistance function, to perform control of the travel velocity and steering of the user vehicle 100 regardless of the intent of a driver. In the present embodiment, following control (ACC: Adaptive Cruise Control), constant velocity control (CC: Cruise Control), and automatic lane change control (ALC: Automatic Lane Change) are performed as the driving assistance. Furthermore, when the following control or the constant velocity control are performed, a lane maintenance assistance system (LKAS: Lane Keeping Assist System) functions.

The vehicle control apparatus 10 includes a main control apparatus 12, an input apparatus group for inputting various types of information into the main control apparatus 12, and an output apparatus group for operating the user vehicle 100 based on various types of information output by the main control apparatus 12. The input apparatus group includes an external environment sensor 14, a navigation apparatus 16, a positioning apparatus 18, a reception apparatus 20, a vehicle behavior sensor 22, a manipulation sensor 24, and an occupant sensor 26. The output apparatus group includes a drive apparatus 28, a braking apparatus 30, a steering apparatus 32, and an HMI (Human Machine Interface) 34.

[1.1. Configuration of the Input Apparatus Group]

The external environment sensor 14 includes a plurality of cameras 40, a plurality of radars 42, and a plurality of LiDARs 44. The cameras 40 capture images of the surroundings of the user vehicle 100 and output image information to the main control apparatus 12. The radars 42 and LiDARs 44 detect a target in the vicinity of the user vehicle 100, and output detection information to the main control apparatus 12.

The navigation apparatus 16 measures the position of the user vehicle 100 using GPS (Global Positioning System), and generates, using a map and an MPU (Micro Processor Unit), a scheduled travel route from the position of the user vehicle 100 to a final destination 122 designated by the driver. The navigation apparatus 16 outputs route information indicating the generated scheduled travel route to the main control apparatus 12.

The positioning apparatus 18 includes a GNSS (Global Navigation Satellite System), an IMU (Inertial Measurement Unit) 48, and a map DB (database) 50. The positioning apparatus 18 measures the position of the user vehicle 100 using the GNSS 46 and the IMU 48, and outputs user vehicle position information indicating the position of the user vehicle 100 to the main control apparatus 12. Furthermore, the positioning apparatus 18 outputs map information, which is stored in the map DB 50, to the main control apparatus 12. The map information stored in the map DB 50 is higher-precision information that the map information stored in the navigation apparatus 16, and includes various types of information (such as information in lane units).

The reception apparatus 20 includes first to third reception terminals (not shown in the drawings). The first reception terminal receives wide-area information broadcast by broadcasting stations. The second reception terminal receives local information transmitted by roadside devices installed along a road. The third reception terminal receives other vehicle information transmitted by another vehicle 102 (FIG. 3 and the like). The first to third reception terminals output the various types of received information to the main control apparatus 12.

The vehicle behavior sensor 22 includes each sensor for measuring the behavior (travel velocity, acceleration/deceleration, yaw rate, and the like) of the user vehicle 100. Each sensor outputs the detected information to the main control apparatus 12.

The manipulation sensor 24 includes an automation switch 52, a mode selecting switch 54, a category selecting switch 56, and a lever sensor 58. The automation switch 52 outputs, to the main control apparatus 12, instruction information including instructions for automating control of or eliminating automated control of any one of the travel velocity and the steering, in response to a switching manipulation performed by the driver. The mode selecting switch 54 outputs, to the main control apparatus 12, selection information indicating which of a plurality driving modes (see section [2.1] below) has been selected, according to a switching manipulation performed by the driver. The category selecting switch 56 outputs, to the main control apparatus 12, selection information indicating which of a plurality categories (see section [2.2] below) has been selected, according to a switching manipulation performed by the driver. The lever sensor 58 detects the manipulation position of a blinker lever L, and outputs manipulation position information indicating the manipulation position of the blinker lever L to the main control apparatus 12. Furthermore, the manipulation sensor 24 includes various sensors for detecting the manipulation amounts of manipulators (acceleration pedal, brake pedal, and steering wheel W).

The occupant sensor 26 includes a touch sensor 60 and an occupant camera 62. The touch sensor 60 is an electrostatic capacitance sensor or a pressure sensor provided to the steering wheel W. The touch sensor 60 detects the gripping state (contact state) of the driver on the steering wheel W, and outputs detection information to the main control apparatus 12. The occupant camera 62 captures an image of the driver, and outputs image information to the main control apparatus 12.

[1.2. Configuration of the Main Control Apparatus 12]

The main control apparatus 12 is formed by an ECU (Electronic Control Unit). The main control apparatus 12 includes an input/output apparatus 66, a computing apparatus 68, a storage apparatus 70, and a timer 71. The input/output apparatus 66 includes an A/D conversion circuit, a communication interface, and the like. The computing apparatus 68 includes a processor such as a CPU (Central Processing Unit), for example. The computing apparatus 68 realizes various functions by executing a program stored in the storage apparatus 70. The various functions of the computing apparatus 68 are described below in section [1.4]. The storage apparatus 70 includes a RAM, a ROM, and the like. The storage apparatus 70 stores various programs and numerical value information, such as threshold values used in the processing performed by the computing apparatus 68.

[1.3. Configuration of the Output Apparatus Group]

The drive apparatus 28 includes a drive force output ECU and a control target of the drive force output ECU (neither of which are shown in the drawings). The drive apparatus 28 adjusts the drive force according to instruction information (drive instructions) output by the main control apparatus 12. The braking apparatus 30 includes a braking ECU and a control target of the braking ECU (neither of which are shown in the drawings). The braking apparatus 30 adjusts the braking force according to instruction information (braking instructions) output by the main control apparatus 12.

The steering apparatus 32 includes an EPS (Electric Power Steering) ECU and a control target of the EPS ECU (neither of which are shown in the drawings). The steering apparatus 32 adjusts the steering amount according to instruction information (steering instructions) output by the main control apparatus 12.

The HMI 34 includes a display apparatus 72 and an audio apparatus 74. The display apparatus 72 outputs video according to instruction information (notification instructions) output by the main control apparatus 12. The audio apparatus 74 outputs sound according to instruction information (notification instructions) output by the main control apparatus 12.

[1.4. Various Functions of the Computing Apparatus 68]

Figure 2:
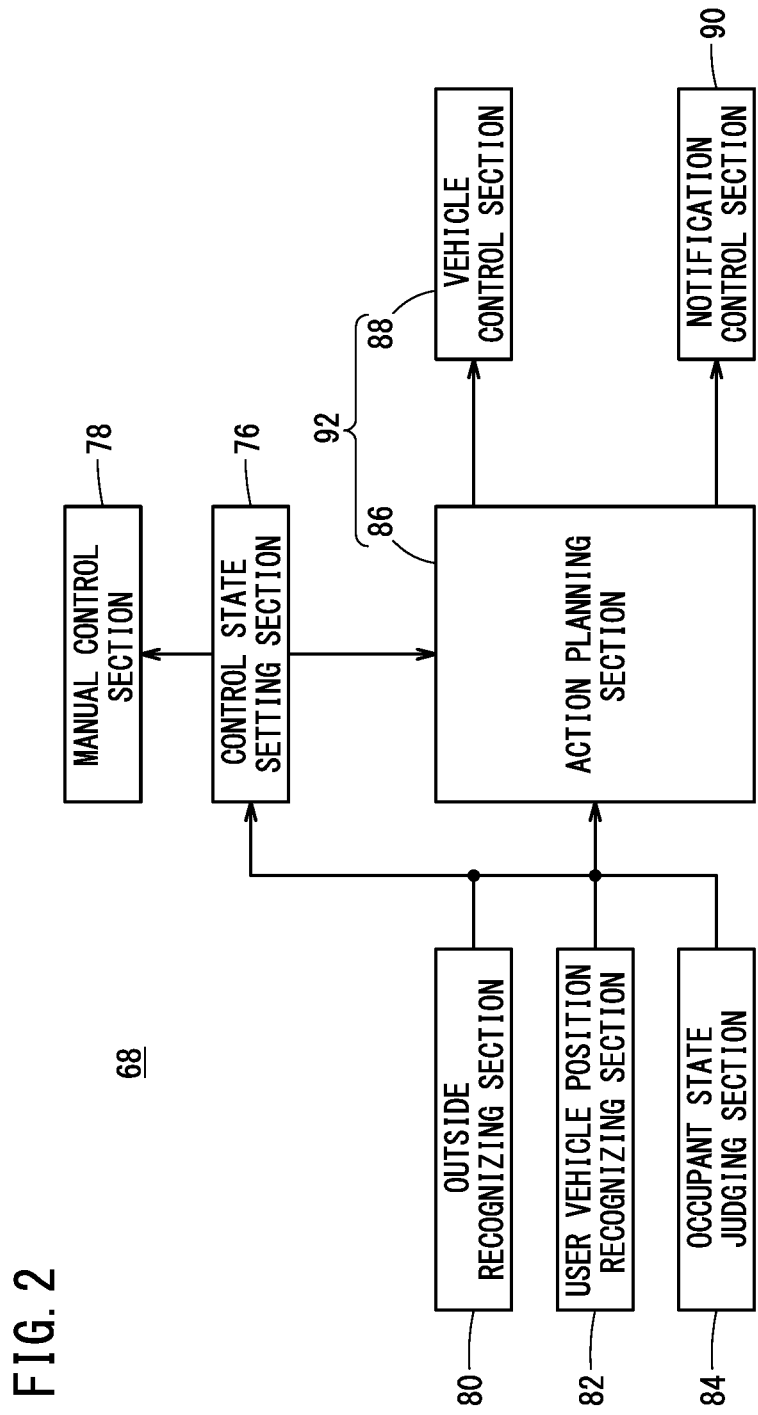
FIG. 2 is a function block diagram of a computing apparatus.

The various functions realized by the computing apparatus 68 will be described using FIG. 2. The computing apparatus 68 functions as a control state setting section 76, a manual control section 78, an outside recognizing section 80, a user vehicle position recognizing section 82, an occupant state determining section 84, an action planning section 86, a vehicle control section 88, and a notification control section 90. The action planning section 86 and the vehicle control section 88 are referred to collectively as a lane change control section 92.

The control state setting section 76 determines whether the various types of travel control (travel velocity control and steering control) are performed using manual control or automated control, according to a manipulation performed with the automation switch 52. Furthermore, the control state setting section 76 determines the degree of automation of the automated control. For example, the control state setting section 76 sets a driving mode to be performed based on the selection information output by the mode selecting switch 54. The driving modes are described below in section [2.1]. Furthermore, the control state setting section 76 sets a category of the automated lane change to be performed, based on the selection information output by the category selecting switch 56. The categories of the automated lane control are described below in section [2.2].

The manual control section 78 performs travel control relating to the manual control in accordance with manipulation amounts of the manipulators (acceleration pedal, brake pedal, and steering wheel W) output by the manipulation sensor 24. The manual control section 78 outputs instruction information (drive instructions, braking instructions, and steering instructions) relating to the manual control to the drive apparatus 28, the braking apparatus 30, and the steering apparatus 32.

The outside recognizing section 80 recognizes the situation around the user vehicle 100 based on the image information and detection information output by the external environment sensor 14. The user vehicle position recognizing section 82 recognizes the position of the user vehicle 100 based on the user vehicle position information and the map information output by the positioning apparatus 18. The occupant state determining section 84 judges the gripping state (touching or not) of the driver on the steering wheel W, based on the detection information output by the touch sensor 60. Furthermore, the occupant state determining section 84 recognizes the observational state of the driver (whether the driver is looking forward, whether the driver's eyes are open) based on the image information output by the occupant camera 62.

The action planning section 86 establishes an action plan relating to the automated control, based on the recognition result of the outside recognizing section 80 and the recognition result of the user vehicle position recognizing section 82. For example, the action planning section 86 generates a local map (dynamic map) that includes static information and dynamic information about the area around the user vehicle 100. The action planning section 86 judges the optimal action based on the local map and the state of the user vehicle 100 (travel velocity, steering, and travel position), and obtains the travel velocity and travel trajectory for realizing this action. Essentially, in the present embodiment, the action planning section 86 functions as a trajectory generating section.

The vehicle control section 88 performs travel control relating to the automated control, in accordance with the action plan. For example, the vehicle control section 88 calculates the acceleration/deceleration for causing the user vehicle 100 to travel at the travel velocity obtained by the action planning section 86. Furthermore, the vehicle control section 88 calculates a steering angle for causing the user vehicle 100 to travel along the travel trajectory obtained by the action planning section 86. The vehicle control section 88 outputs the instruction information (drive instructions, braking instructions, and steering instructions) relating to the automated control to the drive apparatus 28, the braking apparatus 30, and the steering apparatus 32. The notification control section 90 outputs the instruction information (notification information) to the HMI 34 when a notification occurs in the action plan.

[2. Automated Control Performed by the Vehicle Control Apparatus 10]

[2.1. Driving Mode]

The driving mode is set according to a so-called automated driving level. For example, the automated driving levels include level 0 (L0), level 1 (L1), level 2A (L2A), level 2B (L2B), and level 3 (L3). The definition of each level is as follows. The degree of automation becomes higher in the order of L0, L1, L2A, L2B, and L3.

L0: Driving assistance is not substantially performed.

L1: Among the types of driving assistance, one of ACC and LKAS is performed.

L2A: Among the types of driving assistance, both ACC and LKAS are performed.

L2B: Among the types of driving assistance, both ACC and LKAS are performed, and the driver does not need to grip the steering wheel W.

L3: The responsibilities of the driver relating to driving manipulations are more relaxed than at L2B. For example, the driver does not need to observe the situation around the user vehicle 100.

[2.2. Category of the Automated Lane Change]

The automated lane change is divided into three categories. The first category of automated lane change is a first lane change in which the vehicle control apparatus 10 proposes a lane change to the driver and, when the driver has accepted this proposal, the vehicle control apparatus 10 starts the automated lane change. The control performed by the vehicle control apparatus 10 when the first lane change is performed is referred to as the first lane change control. The second category of automated lane change is a second lane change in which the vehicle control apparatus 10 starts the automated lane change without requiring the approval of the driver. The control performed by the vehicle control apparatus 10 when the second lane change is performed is referred to as the second lane change control. The third category of automated lane change is a third lane change in which the vehicle control apparatus 10 starts the automated lane change in response to the intent of the driver. The control performed by the vehicle control apparatus 10 when the third lane change is performed is referred to as the third lane change control.

The vehicle control apparatus 10 permits a single lane change (FIG. 3) or a multiple lane change (FIG. 4) when the first or second category of lane change is being implemented. On the other hand, the vehicle control apparatus 10 permits a single lane change but does not permit a multiple lane change when the third category of lane change is being implemented.

At the time of an automated lane change, the driver provides approval or shows intent for a lane change by manipulating the blinker lever L.

[3. Basics of the Present Embodiment]

Figure 4:
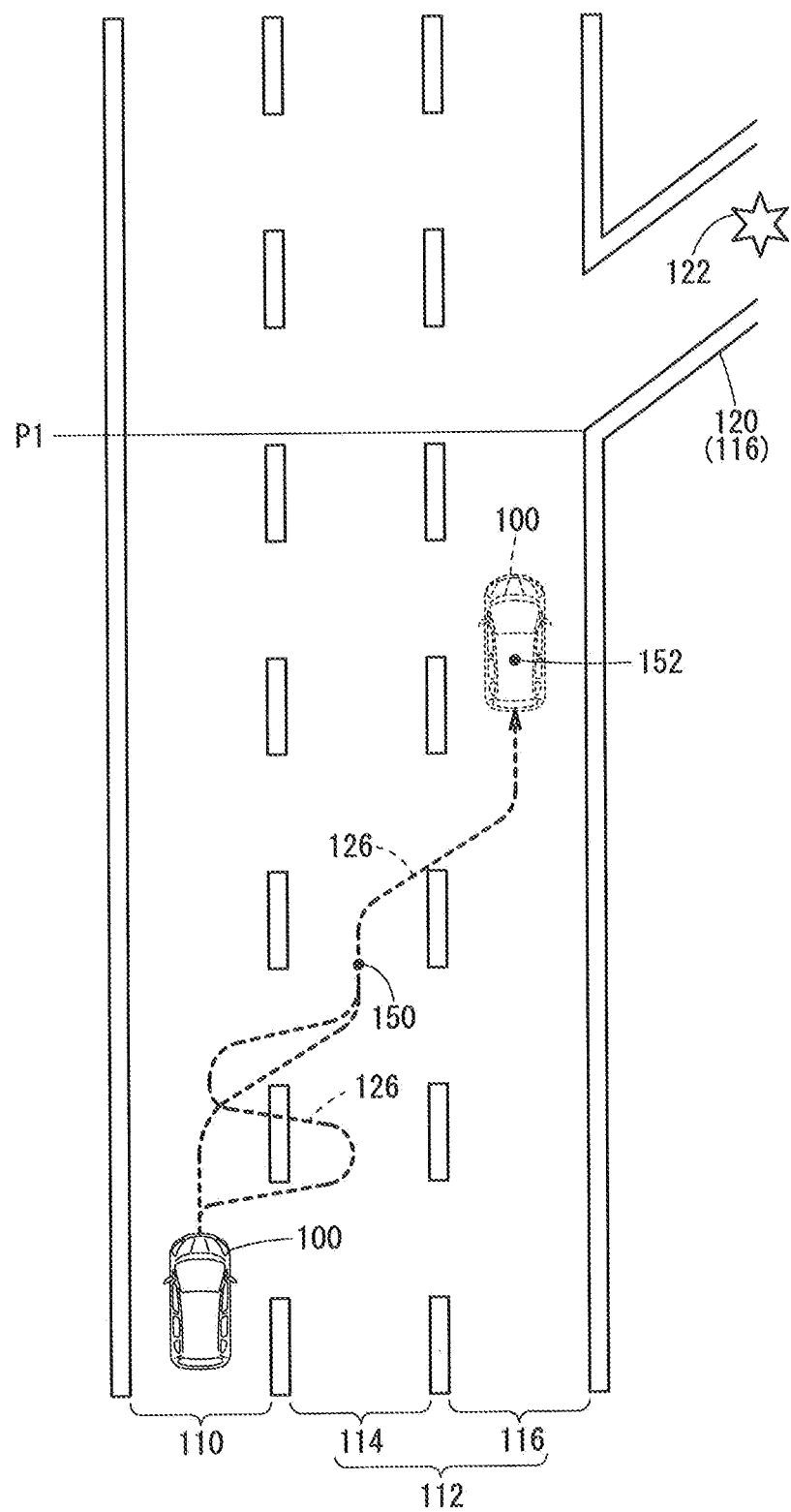
FIG. 4 is a diagram showing a performance state of a multiple lane change.

The following describes the basics of the present embodiment, using FIGS. 3 and 4. As shown in FIG. 3, if a destination 122 is not set, the vehicle control apparatus 10 makes it possible to perform a single lane change causing the user vehicle 100 to perform an automated lane change from a user lane 110 to a first other lane 114 adjacent thereto. When a single lane change is to be performed, the vehicle control apparatus 10 generates a first trajectory 124 from the user lane 110 to the first other lane 114, and causes the user vehicle 100 to travel along this first trajectory 124.

On the other hand, as shown in FIG. 4, if the destination 122 is set, the vehicle control apparatus 10 makes it possible to perform not only a single lane change, but also a multiple lane change causing the user vehicle 100 to perform an automated lane change from the user lane 110 to a second other lane 116 through the first other lane 114. When a multiple lane change is to be performed, the vehicle control apparatus 10 generates a second trajectory 126 from the user lane 110 to the second other lane 116, and causes the user vehicle 100 to travel along the second trajectory 126.

The destination 122 referred to here is one or more waypoints set by the navigation apparatus 16 on a travel route to the final destination. Furthermore, the second other lane 116 referred to here includes a branching path 120 that leads to the destination 122 and the second other lane 116 that directly leads to the branching path 120.

[4. Lane-Changeable Region 130]

The vehicle control apparatus 10 performs an automated lane change inside the lane-changeable region 130. Here, the lane-changeable region 130 is described using FIG. 5. The lane-changeable region 130 is a region in which it is judged that an automated lane change can be performed, based on the lane change time needed from the start to the end of the automated lane change, the position of the branching path 120 (position of the destination 122), and the travel velocity of the user vehicle 100. The lane change time includes a wait time (surrounding area observation time) before lateral movement is started, movement time for the movement from the user lane 110 to the other lane 112 adjacent thereto, and adjustment time for adjusting the travel position in the other lane 112. A distance D1 is necessary for the automated lane change from the user lane 110 to the other lane 112 adjacent thereto, based on the lane change time and the travel velocity of the user vehicle 100.

Figure 5:
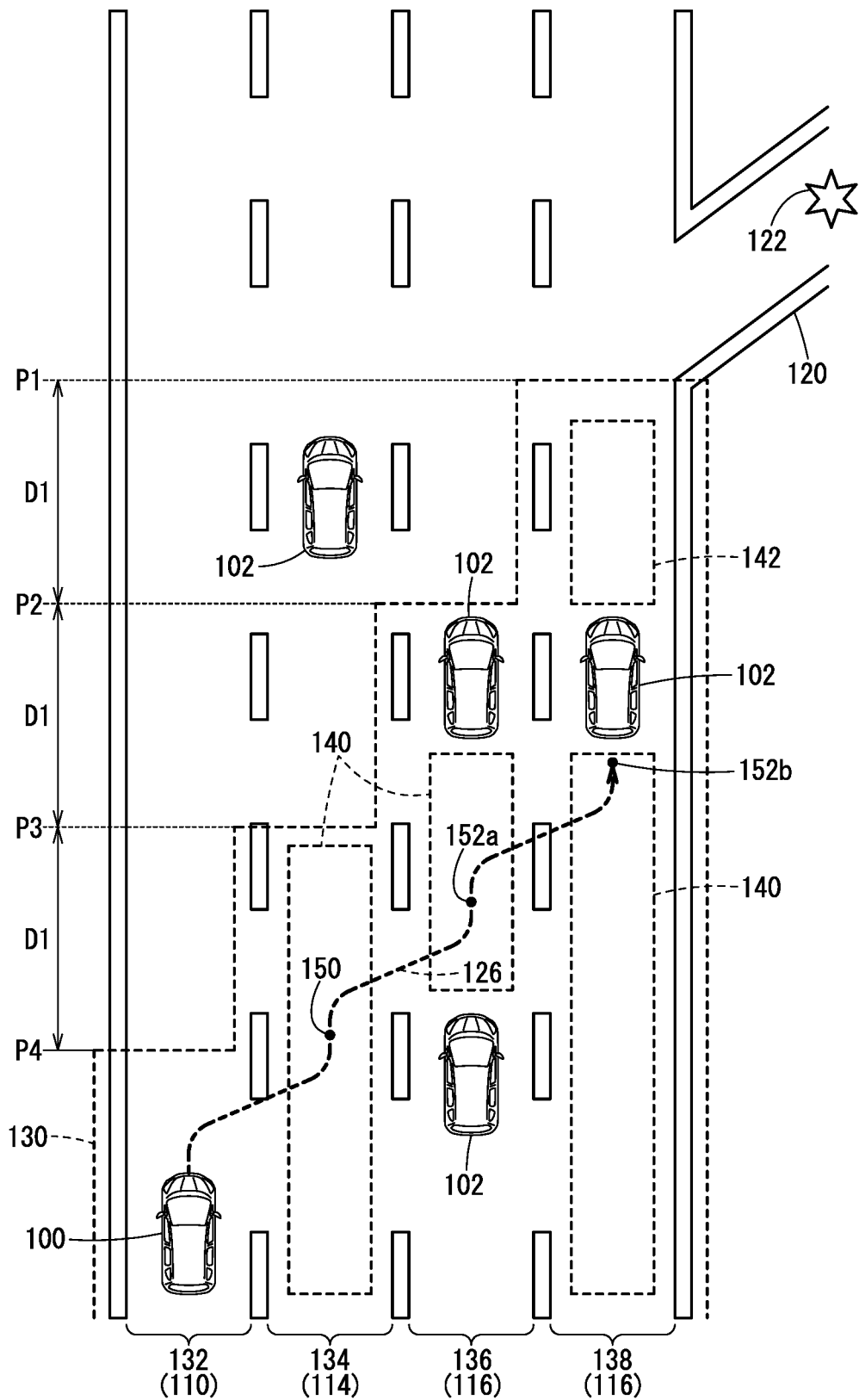
FIG. 5 is a diagram showing a lane-changeable region.

For example, as shown in FIG. 5, it is assumed that the destination 122 of the user vehicle 100 is located on the branching path 120. In order for the user vehicle 100 travelling on the road to progress to the branching path 120, the user vehicle 100 must travel in a fourth lane 138 at the branching position P1 of the branching path 120. Furthermore, in order for the user vehicle 100 to travel in the fourth lane 138 at the branching position P1, the user vehicle 100 must travel in the fourth lane 138 or the third lane 136 at a position P2 that is a distance D1 farther backward than the branching position P1. Similarly, the user vehicle 100 must travel in the fourth lane 138, the third lane 136, or the second lane 134 at a position P3 that is the distance D1 farther backward than the position P2. Similarly, the user vehicle 100 must travel in the fourth lane 138, the third lane 136, the second lane 134, or the first lane 132 at a position P4 that is the distance D1 farther backward than the position P3. The action planning section 86 generates a necessary route for reaching the destination 122, inside the lane-changeable region 130.

The branching position P1 is a position at which the user vehicle 100 changes lanes from the fourth lane 138 to the branching path 120, in order to reach the destination 122. The branching position P2 is a boundary position up to which it is possible for the user vehicle 100 to change lanes from the third lane 136 to the fourth lane 138, in order to reach the destination 122. The branching position P3 is a boundary position up to which it is possible for the user vehicle 100 to change lanes from the second lane 134 to the third lane 136, in order to reach the destination 122. The branching position P4 is a boundary position up to which it is possible for the user vehicle 100 to change lanes from the first lane 132 to the second lane 134, in order to reach the destination 122. When the user vehicle 100 has travelled beyond the respective positions P1 to P4, it becomes difficult for the vehicle control apparatus 10 to cause the user vehicle 100 to reach the destination 122 using automated driving. Therefore, the vehicle control apparatus 10 switches the user vehicle 100 from the automated driving to the manual driving, for example.

The action planning section 86 detects the branching position P1 based on the map information stored in the navigation apparatus 16. The action planning section 86 then sets the boundary position (positions P2 to P4) for the automated lane change in each lane, based on the branching position P1, the lane change time, and the travel velocity of the user vehicle 100. In this way, the lane-changeable region 130 is set with the branching position P1 as a reference.

Furthermore, the action planning section 86 sets a travelable region 140 and an undetectable region 142 within the lane-changeable region 130, based on the recognition result of the outside recognizing section 80. The travelable region 140 is a region in which another vehicle 102 has already travelled and there are no obstructions. The undetectable region 142 is a region that cannot be detected even when each type of information is used. The action planning section 86 generates the first trajectory 124 and the second trajectory 126 using the travelable region 140.

[5. Processes Performed by the Vehicle Control Apparatus 10]

[5.1. Main Process]

Figure 6:
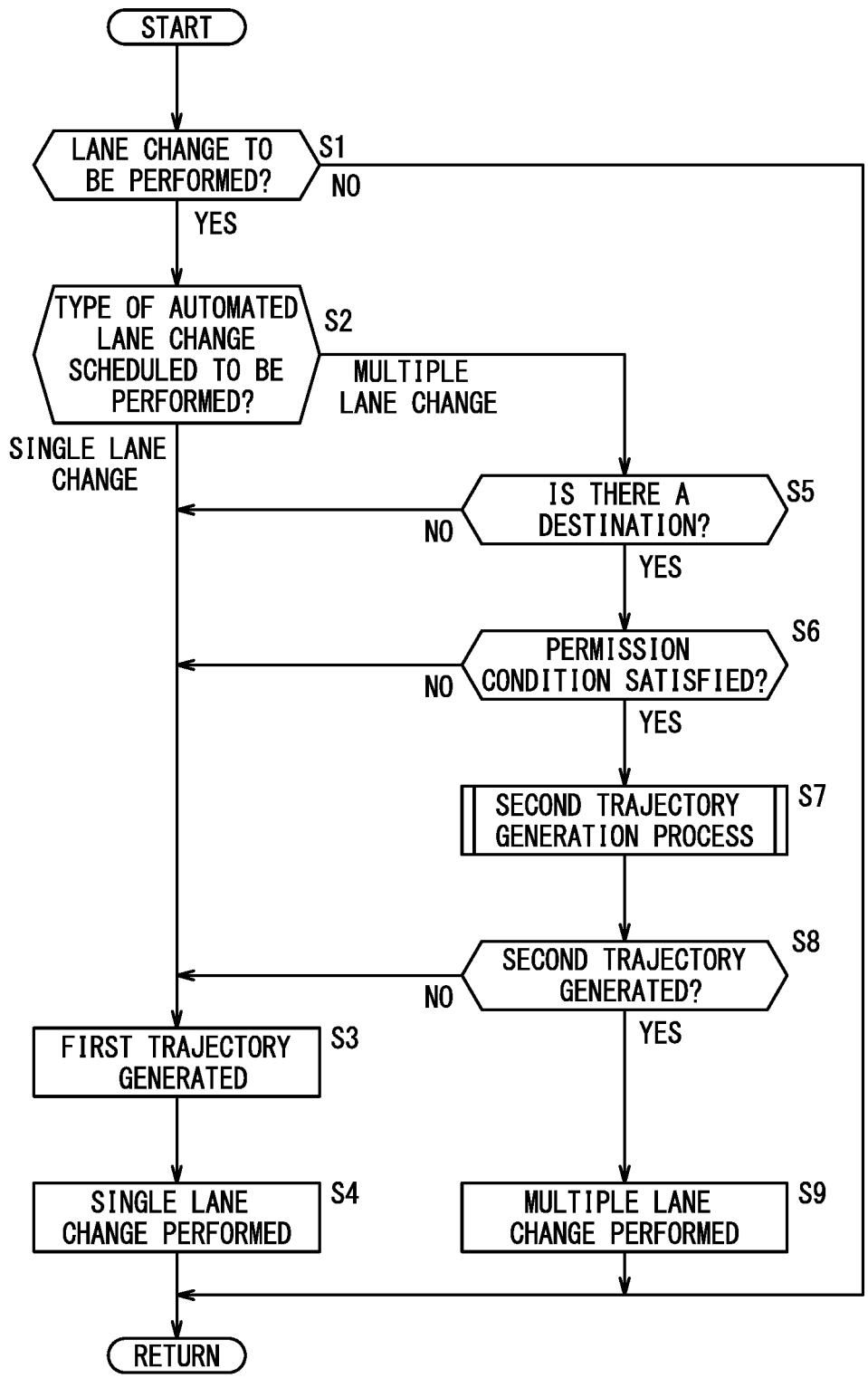
FIG. 6 is a flow chart showing a main process.

The main process performed by the vehicle control apparatus 10 is described using FIG. 6. The main process described below is performed at prescribed time intervals in a state where the control state setting section 76 has set the driving mode to level 2A or higher and set the automated lane change to category 1 or 2.

At step S1, the action planning section 86 judges whether it is possible to perform an automated lane change. The action planning section 86 judges that it is possible to perform an automated lane change if no other vehicle 102 has been detected from the user lane 110 to the other lane 112 that is the target being moved to, based on the recognition result of the outside recognizing section 80. Furthermore, the action planning section 86 judges that it is possible to perform a lane change if, in a situation where an automated lane change of category 1 is set, approval for the lane change proposal has been obtained from the driver. Alternatively, the action planning section 86 judges that it is possible to perform a lane change if, in a situation where an automated lane change of category 2 is set, it is judged that a lane change is necessary to reach the destination 122. If it is possible to perform the automated lane change (step S1: YES), the process moves to step S2. On the other hand, if it is not possible to perform the automated lane change (step S1: NO), this one cycle of the main process ends.

At step S2, the action planning section 86 judges whether the automated lane change that is scheduled to be performed is a single lane change or a multiple lane change. If the automated lane change that is scheduled to be performed is a single lane change (step S2: single lane change), the process moves to step S3. On the other hand, if the automated lane change that is scheduled to be performed is a multiple lane change (step S2: multiple lane change), the process moves to step S5.

At step S3, the action planning section 86 generates the first trajectory 124 from the user lane 110 to the first other lane 114 that is the movement goal, as shown in FIG. 3. When step S3 ends, the process moves to step S4.

At step S4, the vehicle control section 88 causes the user vehicle 100 to travel along the first trajectory 124. The lane change control section 92 judges whether the user vehicle 100 has reached a target position in the first other lane 114, e.g. the center position of the first other lane 114, based on the recognition result of the of the outside recognizing section 80. When the user vehicle 100 reaches the target position in the first other lane 114, the lane change control section 92 ends the single lane change. After this, the main process ends.

On the other hand, when the process moves from step S2 to step S5, the action planning section 86 judges whether a destination 122 is set in the navigation apparatus 16. If a destination 122 is set (step S5: YES), the process moves to step S6. On the other hand, if a destination 122 is not set (step S5: NO), the process moves to step S3. In other words, if a destination 122 is not set in the navigation apparatus 16, a single lane change is performed instead of a multiple lane change.

At step S6, the action planning section 86 judges whether a prescribed permission condition is fulfilled for performing a multiple lane change. For example, the action planning section 86 permits the multiple lane change if a remaining distance from the travel position of the user vehicle 100 to the destination 122 or the branching position P1 of the branching path 120 leading to the destination 122 is greater than a prescribed distance, and does not permit the multiple lane change if this remaining distance is less than or equal to the prescribed distance. Here, the prescribed distance differs according to the lane in which the user vehicle 100 is travelling. For example, in the road shown in FIG. 5, the prescribed distance is a distance from the destination 122 or the branching position P1 to the boundary position (positions P2 to P4) up to which a lane change is possible in each lane. The positions P2 to P4 change according to the travel velocity of the user vehicle 100. The relationship between the travel velocity and the prescribed distance is stored in the storage apparatus 70. Furthermore, the action planning section 86 permits the multiple lane change if the set velocity of the user vehicle 100 is greater than a prescribed velocity, and does not permit the multiple lane change if the set velocity is less than or equal to the prescribed velocity. The set velocity is an upper limit value of the travel velocity allowed for the user vehicle 100, and is set in advance by the driver. The set velocity is stored in the storage apparatus 70. Furthermore, the action planning section 86 permits the multiple lane change if the driving mode is L3, and does not permit the multiple lane change if the driving mode is L2B or lower. If the permission condition is satisfied (step S6: YES), the process moves to step S7. On the other hand, if the permission condition is not satisfied (step S6: NO), the process moves to step S3. In other words, if the permission condition is not satisfied, a single lane change is performed instead of the multiple lane change.

At step S7, the action planning section 86 performs a second trajectory generation process described below in section [5.2]. The second trajectory generation process is a process of generating the second trajectory 126 from the user lane 110 to the second other lane 116 leading to the destination 122, as shown in FIG. 4. When step S7 ends, the process moves to step S8.

At step S8, the action planning section 86 judges whether the second trajectory 126 has been generated by the second trajectory generation process. If the second trajectory 126 has been generated (step S8: YES), the process moves to step S9. On the other hand, if the second trajectory 126 has not been generated (step S8: NO), the process moves to step S3. In other words, if the action planning section 86 cannot generate the second trajectory 126, a single lane change is performed instead of the multiple lane change.

At step S9, the vehicle control section 88 causes the user vehicle 100 to travel along the second trajectory 126. The lane change control section 92 judges whether the user vehicle 100 has reached the target position in the second other lane 116 leading to the destination 122, e.g. the center position of the second other lane 116 or the center position of the branching path 120, based on the recognition result of the outside recognizing section 80. Then, when the user vehicle 100 reaches the target position in the second other lane 116, the lane change control section 92 ends the multiple lane change. After this, the main process ends.

If the user vehicle 100 is to accelerate during the lane change from the user lane 110 to the first other lane 114, the lane change control section 92 causes the user vehicle 100 to accelerate during the lane change from the first other lane 114 to the second other lane 116 as well. This is because a situation in which the user vehicle 100 accelerates during the lane change from the user lane 110 to the first other lane 114 means that the user vehicle 100 is moving from a low-speed lane toward a high-speed lane.

[5.2. Second Trajectory Generation Process]

Figure 7:
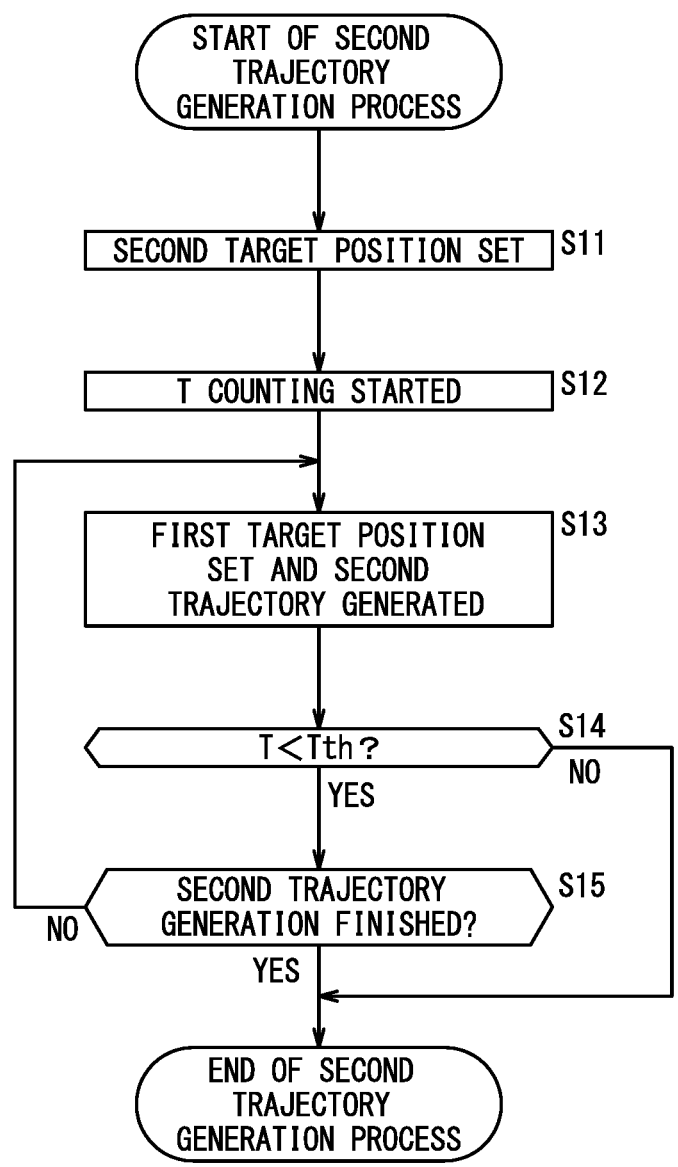
FIG. 7 is a flow chart showing a second trajectory generation process.

The second trajectory generation process performed by the vehicle control apparatus 10 is described using FIG. 7.

At step S11, the action planning section 86 judges the travelable region 140 based on the recognition result of the outside recognizing section 80, and sets the target position in the second other lane 116 leading to the destination 122. This target position is referred to as a second target position 152. In a case where there are a plurality of travelable regions 140 in the second other lane 116 or a case where the travelable region 140 is wide, the action planning section 86 sets a plurality of candidates as target positions. The action planning section 86 then sets the second target position 152 by selecting the optimal target position from among the plurality of target positions. For example, the action planning section 86 sets the second target position 152 by selecting the candidate position at which the change amounts of the travel velocity and steering are smallest. Alternatively, the action planning section 86 sets the second target position 152 by selecting the target position at which the distance to another vehicle 102 is greatest. When step S11 ends, the process moves to step S12.

At step S12, the action planning section 86 starts counting a generation time T of the second trajectory 126, using the timer 71. When step S12 ends, the process moves to step S13.

At step S13, the action planning section 86 sets a target position in the first other lane 114, based on the recognition result of the outside recognizing section 80. This target position is referred to as a first target position 150. The action planning section 86 sets, as the first target position 150 within the first other lane 114, a position that can be moved to from the user lane 110 and from which it is possible to move to the second target position 152. In a case where there are a plurality of travelable regions 140 in the first other lane 114 or a case where the travelable region 140 is wide, the action planning section 86 sets a plurality of candidates as target positions. The action planning section 86 then sets the first target position 150 by selecting the optimal target position from among the plurality of target positions, in the same manner as the setting of the second target position 152. Furthermore, the action planning section 86 generates the second trajectory 126 connecting to the first target position 150 and the second target position 152.

As shown in FIG. 5, there are cases where another second other lane 116 (third lane 136) is present between the second other lane 116 (fourth lane 138) leading to the destination 122 and the first other lane 114 (second lane 134). In such a case, after having set a second target position 152b in the second other lane 116 leading to the destination 122 and before setting the first target position 150, the action planning section 86 sets a second target position 152a in the other second other lane 116 (third lane 136). The action planning section 86 sets, as the second target position 152a, a position at which it is possible to move to the second target position 152b, in the other second other lane 116 (third lane 136).

At step S14 performed simultaneously with step S13, the action planning section 86 compares the generation time T counted by the timer 71 to a prescribed time Tth stored in the storage apparatus 70. If T<Tth (step S14: YES), the process moves to step S15. If T≥Tth (step S14: NO), the second trajectory generation process ends. This means that the second trajectory 126 is not generated before the generation time T reaches the prescribed time Tth.

At step S15, the action planning section 86 judges whether the second trajectory 126 has been generated. If the second trajectory 126 has been generated at this point in time (step S15: YES), the second trajectory generation process ends. Then, the process moves to step S8 shown in FIG. 6. On the other hand, if the second trajectory 126 has not been generated at this point in time (step S15: NO), the process returns to step S13.

[6. Modifications]

A portion of the second trajectory 126 generated by the action planning section 86 may extend in a direction away from the second target position 152. For example, there may be a case where it is impossible to generate a second trajectory 126 extending in order through the user lane 110, the first other lane 114, and the second other lane 116. In such a case, if it is possible to generate a second trajectory 126 extending in order through the user lane 110, the first other lane 114, the user lane 110, the first other lane 114, and the second other lane 116, the action planning section 86 may generate such a second trajectory 126. In this case, when the user vehicle 100 is caused to travel along the second trajectory 126, the lane change control section 92 temporarily permits the user vehicle 100 to perform lane changes in a direction away from the second other lane 116 leading to the destination 122.

In the second trajectory generation process described above, the action planning section 86 sets the first target position 150 after having set the second target positions 152 (152a and 152b). Instead, the action planning section 86 may set the second target positions 152 (152a and 152b) after having set the first target position 150. In such a case, the action planning section 86 sets the target position in order from the lane closest to the user lane 110 toward the farthest other lane 112.

Figure 8:
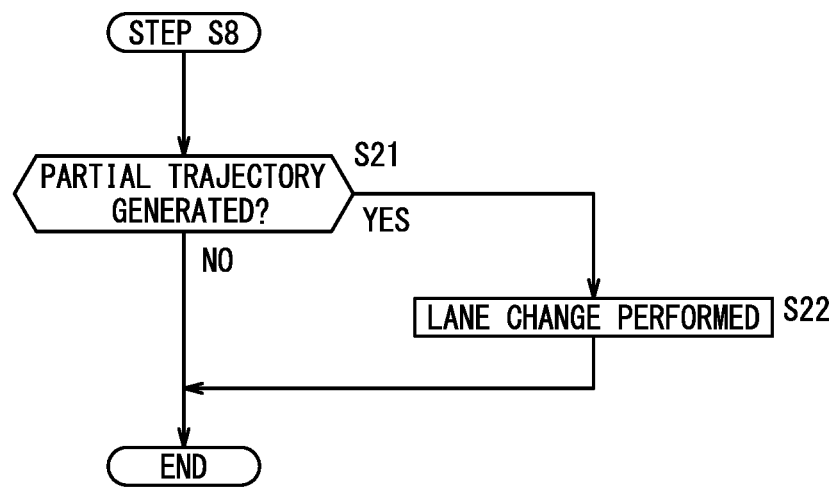
FIG. 8 is a flow chart showing a partial modification of the main process.

Furthermore, the process shown in FIG. 8 may be performed after a NO judgment is made at step S8 of FIG. 6.

At step S21, the action planning section 86 judges whether a partial trajectory, including the first trajectory 124 from the user lane 110 to the first other lane 114, has been generated using the second trajectory generation process. If a partial trajectory has been generated (step S21: YES), the process moves to step S22. On the other hand, if a partial trajectory has not been generated (step S21: NO), the process ends. In this case, the automated lane change is not performed.

At step S22, the lane change control section 92 causes the user vehicle 100 to travel along the partial trajectory, and performs lane changes until changing to another lane 112 that can be reached. When the user vehicle 100 arrives at this reachable other lane 112, the lane change control section 92 again generates the remaining second trajectory 126 that was unable to be generated. Then, if it was possible to generate the remaining second trajectory 126, the lane change control section 92 performs the lane change to the second other lane 116 leading to the destination 122.

The lane change control section 92 may require the approval of the driver when a multiple lane change is to be performed. In such a case, the notification control section 90 output notification instructions providing notification that the multiple lane change will be performed, to the HMI 34. The action planning section 86 judges the approval of the driver based on the detection result of the lever sensor 58. The action planning section 86 performs the multiple lane change if the approval of the user has been acquired.

If the approval of the user has been obtained, the lane change control section 92 may make it unnecessary to obtain approval for a lane change to the second other lane 116 leading to the destination 122 that is to be performed after the approval has been obtained. In the embodiment described above, if the second trajectory 126 to the second other lane 116 cannot be generated, the action planning section 86 causes the lane change up to the other lane 112 for which a trajectory was generated to be performed. After this, the action planning section 86 again generates the second trajectory 126 up to the second other lane 116, and causes the lane change to be performed. In this way, when a multiple lane change to be performed is divided into two or more instances, the action planning section 86 causes the second and following instances of the lane changes to be performed without requiring approval.

There may be a case where a lane change is cancelled during a multiple lane change. For example, if the action planning section 86 is to perform a multiple lane change, it is conceivable that the driver will cancel a lane change. In such a case, the action planning section 86 must again obtain the approval of the driver for the multiple lane change to be performed next.

If the driver manipulates the acceleration pedal or breaking pedal during an automated lane change, the lane change control section 92 may accelerate or decelerate the user vehicle 100 according to this manipulation.

The outside recognizing section 80 is capable of acquiring not only the image information and detection information output by the external environment sensor 14, but also of acquiring inter-vehicle communication information output by the reception apparatus 20 to recognize the situation around the user vehicle 100.

[7. Technical Concepts Obtainable from the Embodiments]

The following is a record of the technical concepts that can be understood from the embodiments described above.

A first aspect of the present invention is a vehicle control apparatus 10 that causes a user vehicle 100 to perform a lane change from a user lane 110 in which the user vehicle 100 is travelling to another lane 112, comprising a judging section (navigation apparatus 16) that judges whether a destination 122 of the user vehicle 100 is set, and a lane change control section 92 that, if the destination 122 is not set, enables performance of a single lane change causing the user vehicle 100 to perform a lane change from the user lane 110 to a first other lane 114, and if the destination 122 is set, enables the single lane change and also enables a multiple lane change causing the user vehicle 100 to perform a lane change from the user lane 110 to a second other lane 116 through the first other lane 114.

According to the above configuration, since the apparatus side judges the presence or lack of the destination 122 and selects one of the single lane change and the multiple lane change according to the result of the judgment, it is possible to reduce the burden on the driver relating to the automated lane change.

The first aspect of the present invention may comprise an outside recognizing section 80 that recognizes an environment around the user vehicle 100, wherein the lane change control section 92 includes a trajectory generating section (action planning section 86) that generates a first trajectory 124 from the user lane 110 to the first other lane 114 based on a recognition result of the outside recognizing section 80 and generates a second trajectory 126 from the user lane 110 to the second other lane 116 leading to the destination 122 based on the recognition result of the outside recognizing section 80, and the lane change control section 92 may cause the user vehicle 100 to travel along the first trajectory 124 when the single lane change is performed and cause the user vehicle 100 to travel along the second trajectory 126 when the multiple lane change is performed.

According to the above configuration, the second trajectory 126 from the user lane 110 to the second other lane 116 is generated for the multiple lane change. The computational burden of generating the second trajectory 126 is relatively low compared to the burden of computing the first trajectory 124 twice. Therefore, according to the above configuration, when a lane change from the user lane 110 to the second other lane 116 is to be performed, the computational load can be reduced compared to performing single lane changes in series.

In the first aspect of the present invention, the trajectory generating section (action planning section 86), when generating the second trajectory 126, may set a first target position 150 as a target position in the first other lane 114 and sets a second target position 152 as a target position in the second other lane 116 leading to the destination 122, and after the second target position 152 has been set, may set the first target position 150 based on the second target position 152.

In the first aspect of the present invention, the trajectory generating section (action planning section 86), when generating the second trajectory 126, may set a first target position 150 as a target position in the first other lane 114 and sets a second target position 152 as a target position in the second other lane 116 leading to the destination 122, and after the first target position 150 has been set, may set the second target position 152 based on the first target position 150.

In the first aspect of the present invention, the trajectory generating section (action planning section 86) may select and set the first target position 150 or the second target position 152 from among a plurality of target positions serving as candidates.

In the first aspect of the present invention, when the multiple lane change is performed, the lane change control section 92 may permit the user vehicle 100 to perform a lane change to a lane in a direction away from the second other lane 116 connecting to the destination 122.

In the first aspect of the present invention, when the multiple lane change is performed, if the lane change control section 92 causes the user vehicle 100 to accelerate for a lane change from the user lane 110 to the first other lane 114, the lane change control section 92 may cause the user vehicle 100 to accelerate during a lane change from the first other lane 114 to the second other lane 116 as well.

In the first aspect of the present invention, if, based on a prescribed condition, the multiple lane change to the second other lane 116 leading to the destination 122 cannot be completed but the trajectory generating section (action planning section 86) can generate a partial trajectory including the first trajectory 124, the lane change control section 92 may switch to a single lane change.

In the first aspect of the present invention, the prescribed condition may be that the trajectory generating section (action planning section 86) cannot generate the second trajectory 126.

In the first aspect of the present invention, the prescribed condition may be that a generation time T of the second trajectory 126 by the trajectory generating section (action planning section 86) is greater than or equal to a prescribed time Tth.

In the first aspect of the present invention, the lane change control section 92 may cause the user vehicle 100 to perform the single lane change from the user lane 110 to the other lane 112 for which it was possible to generate the partial trajectory, and the trajectory generating section may again generate the second trajectory 126 to the second other lane 116 leading to the destination 122 from the other lane 112 into which the user vehicle 100 has moved.

In the first aspect of the present invention, the lane change control section 92 does not need to permit the multiple lane change if a remaining distance to the destination 122 or a branching position P1 of a branching path 120 that leads to the destination 122 is less than or equal to a prescribed distance.

In the first aspect of the present invention, the lane change control section 92 may require approval from a driver when the multiple lane change is to be performed.

In the first aspect of the present invention, if the approval has been acquired from the driver, the lane change control section 92 need not require approval for a lane change to the second other lane 116 leading to the destination 122 performed after the approval has been acquired.

In the first aspect of the present invention, if the multiple lane change is cancelled while being performed, the lane change control section 92 may require the approval of the driver for a lane change performed after the cancellation.

In the first aspect of the present invention, the user vehicle 100 may be a vehicle capable of travelling by setting one of a plurality of automated driving levels, and if the automated driving level set for the user vehicle is a level (level 3) at which it is not necessary for a driver to observe an environment around the user vehicle 100 and at which the driver does not need to grip a steering wheel W, the lane change control section 92 may make it possible to perform the multiple lane change.

Another implementation of the first aspect of the present invention is a vehicle control method causing a user vehicle 100 to perform a lane change from a user lane 110 in which the user vehicle 100 is travelling to another lane 112, comprising a judgment step of judging whether a destination 122 of the user vehicle 100 is set, and a lane change step of, if the destination 122 is not set, enabling performance of a single lane change causing the user vehicle 100 to perform a lane change from the user lane 110 to a first other lane 114 next to the user lane 110, and if the destination 122 is set, enabling the single lane change and also enabling a multiple lane change causing the user vehicle 100 to perform a lane change from the user lane 110 to a second other lane 116 through the first other lane 114.

A second aspect of the present invention is a vehicle control apparatus 10 that causes a user vehicle 100 to perform a lane change from a user lane 110 in which the user vehicle 100 is travelling to another lane 112, comprising an outside recognizing section 80 that recognizes an environment around the user vehicle 100; a trajectory generating section (action planning section 86) that generates a trajectory from the user lane 110 to the other lane 112, based on a recognition result of the outside recognizing section 80; and a vehicle control section 88 that causes the user vehicle 100 to travel along the trajectory, wherein: if the user vehicle 100 is to perform a lane change from the user lane 110 to a first other lane 114, the trajectory generating section generates a first trajectory 124 from the user lane 110 to the first other lane 114 and the vehicle control section 88 performs a single lane change causing the user vehicle 100 to travel along the first trajectory 124; and if the user vehicle 100 is to perform a lane change from the user lane 110 and through the first other lane 114 to a second other lane 116 leading to a destination 122, the trajectory generating section generates a second trajectory 126 from the user lane 110 to the second other lane 116 and the vehicle control section 88 performs a multiple lane change causing the user vehicle 100 to travel along the second trajectory 126.

According to the above configuration, since the single lane change and multiple lane change are performed by an apparatus, it is possible to reduce the burden on the driver relating to the automated lane change.

Furthermore, with the above configuration, the second trajectory 126 from the user lane 110 to the second other lane 116 is generated for the multiple lane change. The computational burden of generating the second trajectory 126 is relatively low compared to the burden of computing the first trajectory 124 twice. Therefore, according to the above configuration, when a lane change from the user lane 110 to the second other lane 116 is to be performed, the computational load can be reduced compared to performing single lane changes in series.

Another implementation of the second embodiment according to the present invention is a vehicle control method for causing a user vehicle 100 to perform a lane change from a user lane 110 in which the user vehicle 100 is travelling to another lane 112, comprising an outside recognition step of recognizing an environment around the user vehicle 100; a trajectory generation step of generating a trajectory from the user lane 110 to the other lane 112, based on a recognition result of the outside recognition step; and a vehicle control step of causing the user vehicle 100 to travel along the trajectory, wherein: if the user vehicle 100 is to perform a lane change from the user lane 110 to a first other lane 114, the trajectory generation step includes generating a first trajectory 124 from the user lane 110 to the first other lane 114 and the vehicle control step includes performing a single lane change causing the user vehicle 100 to travel along the first trajectory 124; and if the user vehicle 100 is to perform a lane change from the user lane 110 and through the first other lane 114 to a second other lane 116 leading to a destination 122, the trajectory generation step includes generating a second trajectory 126 from the user lane 110 to the second other lane 116 and the vehicle control step includes performing a multiple lane change causing the user vehicle 100 to travel along the second trajectory 126.

The vehicle control apparatus and vehicle control method according to the present invention are not limited to the above-described embodiments, and it goes without saying that various configurations could be adopted therein without departing from the scope of the present invention.

What is claimed is:

1. A vehicle control apparatus that causes a user vehicle to perform an automated lane change from a user lane in which the user vehicle is travelling to another lane, the vehicle control apparatus comprising:
   one or more processors that execute computer-executable instructions stored in a memory, wherein the one or more processors execute the computer-executable instructions to cause the vehicle control apparatus to:
   set a final destination of the user vehicle when a user designates the final destination;
   set one or more destinations on a travel route, the travel route leading to the final destination of the user vehicle when the final destination is set;
   enable planning of the automated lane change regardless of an intent of the user and performance of the automated lane change as planned;
   enable planning and performance of each of a single lane change causing the user vehicle to perform the automated lane change from the user lane to a first other lane and a multiple lane change causing the user vehicle to perform the automated lane change from the user lane through the first other lane to a second other lane leading to the one or more destinations; and judge whether the one or more destinations of the user vehicle are set, wherein if the one or more destinations are not set and there is no second other lane, the one or more processors cause the vehicle control apparatus to enable planning and performance of the single lane change and disable planning and performance of the multiple lane change, if the one or more destinations are not set and there is the second other lane, the one or more processors cause the vehicle control apparatus to enable planning and performance of the single lane change and disable planning and performance of the multiple lane change, and if the one or more destinations are set and there is the second other lane, the one or more processors cause the vehicle control apparatus to enable planning and performance of the single lane change and also enable planning and performance of the multiple lane change.

2. The vehicle control apparatus according to claim 1, wherein the one or more processors cause the vehicle control apparatus to:

recognize an environment around the user vehicle; generate a first trajectory from the user lane to the first other lane based on a recognition result or generate a second trajectory from the user lane to the second other lane based on the recognition result; and cause the user vehicle to travel along the first trajectory when the single lane change is performed and cause the user vehicle to travel along the second trajectory when the multiple lane change is performed.

3. The vehicle control apparatus according to claim 2, wherein the one or more processors cause the vehicle control apparatus to:

when generating the second trajectory, set a first target position as a target position in the first other lane and set a second target position as a target position in the second other lane; and after the second target position has been set, set the first target position based on the second target position.

4. The vehicle control apparatus according to claim 2, wherein the one or more processors cause the vehicle control apparatus to:

when generating the second trajectory, set a first target position as a target position in the first other lane and set a second target position as a target position in the second other lane; and after the first target position has been set, set the second target position based on the first target position.

5. The vehicle control apparatus according to claim 3, wherein the one or more processors cause the vehicle control apparatus to:

select and set the first target position or the second target position from among a plurality of target positions serving as candidates.

6. The vehicle control apparatus according to claim 2, wherein the one or more processors cause the vehicle control apparatus to:

when the multiple lane change is performed, permit the user vehicle to perform the automated lane change to a lane in a direction away from the second other lane.

7. The vehicle control apparatus according to claim 2, wherein the one or more processors cause the vehicle control apparatus to:

when the multiple lane change is performed, if the user vehicle is caused to accelerate for the automated lane change from the user lane to the first other lane, cause the user vehicle to accelerate during the automated lane change from the first other lane to the second other lane as well.

8. The vehicle control apparatus according to claim 2, wherein the one or more processors cause the vehicle control apparatus to:

if, based on a prescribed condition, the multiple lane change to the second other lane cannot be completed but a partial trajectory including the first trajectory can be generated, switch to the single lane change.

9. The vehicle control apparatus according to claim 8, wherein:

the prescribed condition is that the vehicle control apparatus cannot generate the second trajectory.

10. The vehicle control apparatus according to claim 8, wherein:

the prescribed condition is that a generation time of the second trajectory is greater than or equal to a prescribed time.

11. The vehicle control apparatus according to claim 9, wherein the one or more processors cause the vehicle control apparatus to:

cause the user vehicle move according to the single lane change from the user lane to the other lane for which it was possible to generate the partial trajectory; and again generate the second trajectory to the second other lane from the other lane into which the user vehicle has moved.

12. The vehicle control apparatus according to claim 1, wherein the one or more processors cause the vehicle control apparatus to:

permit the single lane change but not permit the multiple lane change if a remaining distance to the one or more destinations or a branching position of a branching path that leads to the destination is less than or equal to a prescribed distance.

13. The vehicle control apparatus according to claim 1, wherein the one or more processors cause the vehicle control apparatus to:

require approval from a driver when the multiple lane change is to be performed.

14. The vehicle control apparatus according to claim 13, wherein the one or more processors cause the vehicle control apparatus to:

if the approval has been acquired from the driver, not require approval for the automated lane change to the second other lane performed after the approval has been acquired.

15. The vehicle control apparatus according to claim 14, wherein the one or more processors cause the vehicle control apparatus to:

if the multiple lane change is cancelled while being performed, require the approval of the driver for the automated lane change performed after the cancellation.

16. The vehicle control apparatus according to claim 1, wherein:

the user vehicle is a vehicle capable of travelling by setting one of a plurality of automated driving levels; and the one or more processors cause the vehicle control apparatus to, if the automated driving level set for the user vehicle is a level at which it is not necessary for a driver to observe an environment around the user vehicle and at which the driver does not need to grip a steering wheel, make it possible to perform the multiple lane change.

17. A vehicle control method causing a user vehicle to perform an automated lane change from a user lane in which the user vehicle is travelling to another lane, comprising:
- setting a final destination of the user vehicle when a user designates the final destination;
- setting one or more destinations on a travel route to the final destination of the user vehicle when the final destination is set;
- enabling planning of the automated lane change regardless of an intent of the user and performance of the automated lane change as planned;
- enabling planning and performance of each of a single lane change causing the user vehicle to perform the automated lane change from the user lane to a first other lane and a multiple lane change causing the user vehicle to perform the automated lane change from the user lane through the first other lane to a second other lane leading to the one or more destinations; and
- judging whether the one or more destinations of the user vehicle are set, wherein
- if the one or more destinations are not set and there is no second other lane, planning and performance of the single lane change is enabled and planning and performance of the multiple lane change is disabled, and
- if the one or more destinations are set and there is no second other lane, planning and performance of the single lane change and planning and performance of the multiple lane change are enabled.

* * * * *